May 23, 1933.　　　　　M. P. YOUKER　　　　1,910,734

TREATMENT OF HYDROCARBON LIQUIDS SUCH AS GASOLINE, KEROSENE, AND THE LIKE

Filed Nov. 26, 1928

Malcolm P. Youker
INVENTOR

Patented May 23, 1933

1,910,734

UNITED STATES PATENT OFFICE

MALCOLM P. YOUKER, OF TULSA, OKLAHOMA, ASSIGNOR TO PHILLIPS PETROLEUM COMPANY, OF BARTLESVILLE, OKLAHOMA, A CORPORATION OF DELAWARE

TREATMENT OF HYDROCARBON LIQUIDS SUCH AS GASOLINE, KEROSENE, AND THE LIKE

Application filed November 26, 1928. Serial No. 321,960.

My invention relates to the treatment of petroleum distillates in the vapor phase and has particular reference to the oxidation of impurities in cracked gasoline while such gasoline is in a heated and vaporous state. An object of my invention is to remove from cracked gasoline objectionable gum forming and odorous compounds. By my invention this advantage is accomplished and likewise other advantages which will become apparent.

My invention will be understood from the following description taken in connection with the accompanying drawing in which.

Figure 1:
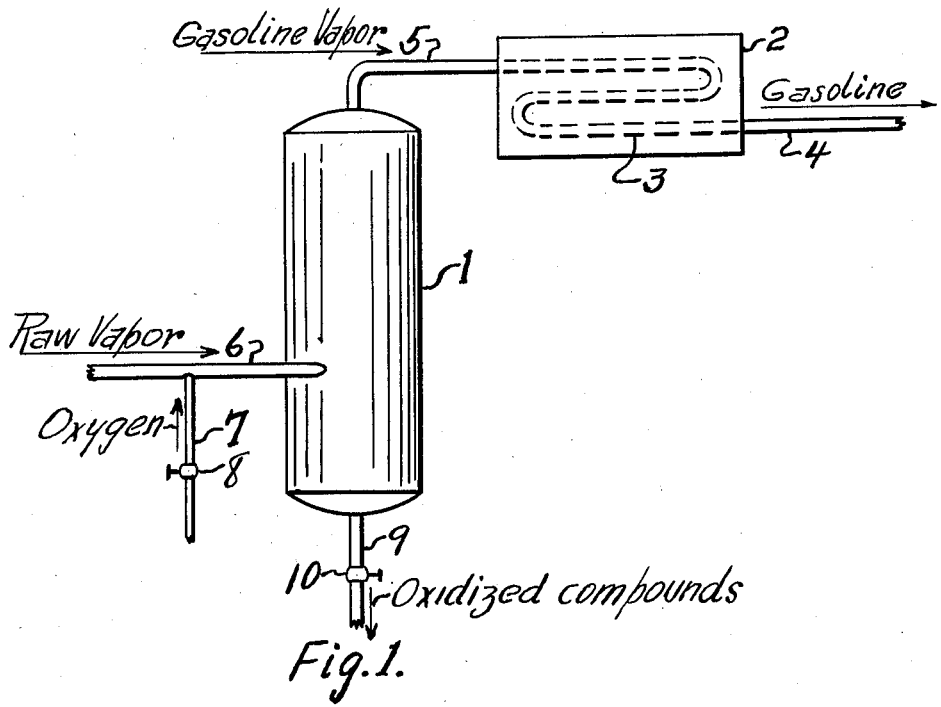
Figure 1 illustrates diagrammatically in side elevation one form of apparatus by which my new process may be carried out.
Figure 2:
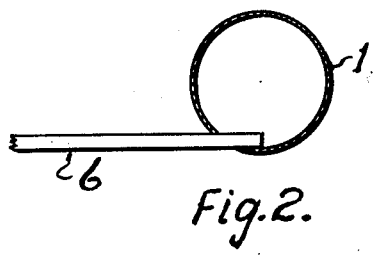
Figure 2 shows a horizontal cross section taken thru the apparatus illustrated in Figure 1.

Referring to the drawing, the numeral 1 designates a closed cylindrical vessel which is vertically disposed. The numeral 2 designates a condensing box which is in communication with a supply of cold water and in which is disposed a condensing coil 3. A pipe line 4 leads from the outlet of condensing coil 3. Pipe line 5 leads from the top of vessel 1 into the inlet of condensing coil 3. A pipe line 6 which is in communication with a supply of petroleum vapor, which is to be treated, enters the cylindrical vessel 1 in such a manner that the line of the pipe 6 is tangential to the inner-cylindrical surface of vessel 1. A pipe 7 in which is mounted a valve 8, and which is in communication with a supply of treating chemicals, runs into the pipe 6. A pipe 9 in which is mounted a valve 10 leads from the bottom of vessel 1.

This apparatus will be operated to carry out my new process in the following manner:

Cracked gasoline vapor will be caused to flow thru pipe 6 into and thence upward thru vessel 1 and thence thru pipe 5 into condensing coil 3. Condensed gasoline and non-condensable gases will be withdrawn from condensing coil 3 thru pipe 4 to storage tanks which are not shown. Oxygen in some form will introduce thru the pipe 7 into the pipe 6 and will there mingle with vapors which will travel forward thru pipe 6. The vessel 1 will preferably be of such size as to provide a considerable time interval for the passage of vapors thru this vessel; the longer this time interval is, the better will be the result obtained from the process. The oxygen which will be introduced into the cracked gasoline vapor in pipe 6, will combine with undesirable unsaturated hydro-carbons and sulphur compounds, and together with these compounds will settle out of the vapor in the vessel 1 and will be withdrawn from the vessel 1 thru pipe 9 by the operation of valve 10. The gasoline vapors will enter the vessel 1 at considerable velocity and tangentially and immediately adjacent to the inner-wall of the chamber 1 which will cause a rapid rotating movement of vapors in the vessel 1 which will throw to the side of the vessel 1 and thus separate from the vapors oxidized compounds formed in the vessel 1.

This apparatus will preferably be used as a part of a continuous fractional distillation unit by which petroleum products are vaporized and rectified and thus separated in the vapor phase from petroleum oils or as a part of a continuous cracking still by which cracked gasoline is produced and rectified in the vapor phase. Products produced by such stills will, while in the vapor phase and preferably after rectification, be charged thru this apparatus and treated as described above.

If this apparatus is operated under atmospheric pressure for the purpose of treating ordinary commercial gasoline, a temperature between 300 degrees Fahrenheit and 350 degrees Fahrenheit will be obtained in the vessel 1. At this temperature good results will be obtained by the introduction of air into the system thru pipe 7. For more rapid oxidation, commercially pure oxygen or ozone will be introduced into the system thru pipe 7. The vessel 1 should be well insulated to prevent loss of heat. A valve may be installed in the pipe 4 thru manipulation of which super-atmospheric pressure may be obtained in the vessel 1. The maintenance of super-atmospheric pressure in the vessel 1 would result in increasing the pressure under which vapors undergoing treatment would be produced and thus cause higher temperatures to be attained in the sphere of the process which would make for more rapid oxidation.

I claim—

1. A process for the treatment of hydrocarbons which consists in mixing oxygen with hydrocarbon vapors at atmospheric pressure, subsequently injecting the mixture tangentially in a closed chamber, maintaining said chamber at a temperature of between 300° and 350° F., and thereby causing the oxygen to combine with undesirable unsaturated hydrocarbons and sulphur compounds, retaining the mixture in said chamber until the combination of oxygen, undesirable unsaturated hydrocarbons and sulphur compounds separate from the vapors, removing the purified vapors from the chamber, and condensing said vapors.

2. A process for the treatment of cracked gasoline which consists in mixing oxygen with cracked gasoline which is in the vapor phase, under atmospheric pressure, subsequently injecting this mixture tangentially in a closed chamber for a sufficient length of time to allow the oxygen to combine with undesirable unsaturated hydrocarbons and sulphur compounds, maintaining said chamber at a temperature of between 300° and 350° F., causing said combination of oxygen, undesirable unsaturated hydrocarbons and sulphur compounds to settle and separate from the purified cracked gasoline in said chamber, removing the vapors from said chamber, and condensing said vapors.

In testimony whereof I affix my signature.

MALCOLM P. YOUKER.